United States Patent
Koppinen et al.

(10) Patent No.: US 6,677,561 B1
(45) Date of Patent: Jan. 13, 2004

(54) COIL FOR INDUCTION HEATING OF A STRIP OR ANOTHER ELONGATE METAL WORKPIECE

(75) Inventors: Ilpo Koppinen, Pori (FI); Brian Swank, Marengo, OH (US)

(73) Assignee: Outokumpu Oyj, Espoo (FI)

( * ) Notice: Subject to any disclaimer, the term of this patent is extended or adjusted under 35 U.S.C. 154(b) by 0 days.

(21) Appl. No.: 10/274,678

(22) Filed: Oct. 21, 2002

(51) Int. Cl.[7] .............................. H05B 6/10; H05B 6/40
(52) U.S. Cl. ...................... 219/645; 219/646; 219/672; 219/673; 148/567
(58) Field of Search .................... 219/645, 646, 219/635, 672, 673, 674, 675, 676, 670; 148/567, 568; 266/129

(56) References Cited

U.S. PATENT DOCUMENTS

| | | | |
|---|---|---|---|
| 3,031,555 A | * | 4/1962 | Ross et al. .................. 219/645 |
| 3,196,244 A | * | 7/1965 | Wulf .......................... 219/673 |
| 4,054,770 A | | 10/1977 | Jackson et al. |
| 4,185,183 A | | 1/1980 | Kamimoto |
| 4,587,392 A | * | 5/1986 | Chausse et al. ............. 219/645 |
| 4,751,360 A | | 6/1988 | Ross |
| 4,778,971 A | * | 10/1988 | Sakimoto et al. ............ 219/645 |
| 5,025,122 A | * | 6/1991 | Howell ........................ 219/672 |
| 5,308,946 A | | 5/1994 | Mohr |
| 5,397,877 A | | 3/1995 | Couffet et al. |
| 5,403,994 A | | 4/1995 | Havas et al. |
| 5,510,600 A | | 4/1996 | Jackson |
| 6,255,634 B1 | | 7/2001 | Bowers |
| 6,300,608 B2 | * | 10/2001 | Inoh et al. ................... 219/646 |
| 2002/0148830 A1 | * | 10/2002 | Ross .......................... 219/645 |

* cited by examiner

*Primary Examiner*—Philip H. Leung
(74) *Attorney, Agent, or Firm*—Morgan & Finnegan LLP

(57) ABSTRACT

The invention relates to a coil to be used in transverse flux induction heating of an object in the form of a metal strip or another elongate metal workpiece. The coil contains at least one pair of loops of conductors, which are non-symmetrically positioned to each other and the conductors overlap each other so that the inductor has double conductors across the object to be heated and a single conductor parallel to the object to be heated at the edges. The heating effect is prevented alone in the conductors by dividing the induced current for the conductors to two equal branches each having the same width as the original current and the combined heating effect in the branches is only half of the heating effect before branching.

18 Claims, 2 Drawing Sheets

COIL FOR INDUCTION HEATING OF A STRIP OR ANOTHER ELONGATE METAL WORKPIECE

This invention relates to a coil to be used in induction heating of an object in the form of a metal strip or another elongate metal workpiece.

Most common coils for induction heating are solenoid coils, however solenoid coils are not suitable for induction heating of thin strip. Instead, the coils are arranged so that the magnetic flux passes the strip transversal to the strip plane. Such arrangement is commonly called transverse flux induction heating (TFX). The main problem with transverse flux coils is the temperature profile; the edges tend to overheat. This is apparent when considering the induction current loop induced to the strip and accumulated energy in the strip when it passes the inductor. In order to eliminate the overheating of edges the induction coil can be shaped in such a way that the coil is relatively short in the strip direction.

It is also possible to use flux modifiers at the edge area to spread out the longitudinal path of the current loop. The current density within the induced current path varies but for the simplicity we can assume that the current path has a well-defined width and within that induced current path the current density is constant. The heating power per unit length of the current path is $$P = I^2 \times R, \tag{1}$$

wherein I is the induced current and R the resistance. By spreading the current path with flux modifiers the resistance R is reduced and thus the heating power in the strip is reduced. The disadvantages with this system are a) even with adjustable flux modifiers one inductor can cover only a small width range, b) during the heating the temperature differences between edge and centre during the heating are high and can cause buckling in the strip and c) this method cannot be used for narrow strip which fact becomes obvious if one considers the actual manufacturing of the inductor for instance 20 mm wide strip.

One possible method for narrow strip is using two different types of inductors; single loop inductor heating the area between the edge and the centre and double loop inductor heating the centre and the edges. The disadvantages with this technology are: a) the coils are rather expensive, since the coils are wear parts and they become a significant part of the annealing cost, b) large temperature differences between different parts of the strip causing buckling risk, c) a single set of coil can cover only a small width range, and this increases the coil cost further and also causes set-up time when changing strip width and d) this method cannot be used for very narrow strips. Also with these coils flux concentrators are used but they do not essentially eliminate the disadvantages mentioned above.

These and other means for addressing the temperature profile problem are disclosed in many patents: In the U.S. Pat. No. 4,054,770 the transverse flux heating of strip material is effected with a flux distribution having a low value near the margins of the strip and rising substantially uniformly inwardly from the margins to a central peak value for narrow strip or two peaks with a central lower region for wider strip. This requires constructions of pole pieces to achieve the required flux. The U.S. Pat. No. 4,185,183 describes an induction heating apparatus for induction heating a strip metallic sheet material, which uses adjustable flux concentrators in order to adapt the heating distribution to be made uniform throughout the width of the material. The U.S. Pat. No. 4,751,360 relates to transverse flux heating of metal strips, which uses an adjustable width coil consisting of J-shaped parts to evenly heat strips of variable width and thickness. Similar J-shaped conductors are described in the U.S. Pat. No. 5,403,994.

The U.S. Pat. No. 4,778,971 describes an induction heating apparatus, wherein one or more main coils are used and in addition to these main coils auxiliary correction coils are used in order to provide good temperature uniformity over the full width of the workpiece. The U.S. Pat. No. 5,308,946 relates to an apparatus and a method for electrical induction heating of metal strips and slabs. This method is based on a plurality of pairs of individual electrical coils exposed on opposite sides of a path of movement of a metal strip or slab wherein the coils are elongated longitudinally of the path of movement of the metal strip or slab. The U.S. Pat. No. 5,397,877 relates to a device for the induction heating of flat metallic products on the move with the aid of electric coils. In this device the magnetic fields generated are in phase opposition, leading to a ring-like distribution of the currents induced in the product to be heated up. The U.S. Pat. No. 5,510,600 describes an induction heating apparatus for heating an elongate metal workpiece in which apparatus time varying magnetic fields are generated which fields produce longitudinal eddy current distributions across the width of the workpiece having cosine and sine profiles. This device is controlling the spatial profile of magnetic fields in a complex way. The U.S. Pat. No. 6,255,634 relates to a transverse flux heating coil for a wire. The coil includes a first conductor having a width facing an internal heating area that is substantially greater than a thickness and is constructed of planar copper bar stock. A second conductor, constructed substantially identical to the first conductor, is arranged parallel with the first conductor to form a pair of elongated flux generating sides of the internal heating area. A third conductor is provided at one end of the transverse flux heating coil to conduct current from one of the first and second conductors to the other.

All disclosed apparatuses above have two sets of symmetric induction coils, one set on each side of the strip. In other words, those apparatuses would also work if the coils on one side of the strip were removed. The only reason for having those two sets of coils is a better efficiency.

The object of the present invention is to eliminate some drawbacks of the prior art and to achieve an improved coil to be used in induction heating of an object in the form of a metal strip or other elongate metal workpiece. The essential features of the invention are enlisted in the appended claims.

According to the invention the coil for transverse flux induction heating of an object in the form of a metal strip or other elongate metal workpiece contains at least one pair of loops of conductors. The coil is thus divided into two parts, which are preferably substantially identical in shape. The parts of the coil are non-symmetrically placed on each side and so that alone these parts of the coil would not have the heating effect, either, which means that the heating effect is prevented alone in these parts. Thus the induced current path is divided to two equal branches each having the same width as the original path and the combined heating effect in the branches is only half of the heating effect before branching.

The basis for the invention is applying the abovementioned formula (1) for the power:

$$P = I^2 \times R. \tag{1}$$

When the induced current path I is divided to equal ½ in branches, the power in both branches is $$P = I^2/4 \times R. \quad (2)$$

Thus the combined heating effect is only half of the heating effect before branching. When now thinking a strip and the temperature distribution thereon it is possible to achieve a full heating effect for the bulk of the strip and the quarter effect at the edges with a multi loop inductor by making the induced current loops to overlap partly each other. This effect can be multiplied using two or more pairs of induced current loops to overlap respectively each other. These loops overlap each other so that the inductor has double conductors across the strip but only single conductors parallel to the strip at the edges. Therefore, the cross current has a full heating effect, but the edge currents only a quarter heating effect based on the formula (2). This helps avoiding overheating the edges. In the practical coil making it is also needed to consider the ends of the coils and connecting the coil to the power source. In one preferred embodiment of the invention, the overlapping loops are made using two zigzag conductors and the conductors are superimposed on each other to form a multi loop inductor.

In one preferred embodiment of the invention using the overlapping loops the two sides of the inductor is kept as separate pieces as well as kept the conductors in and out parallel and close to each other to cancel the magnetic fields. The ends of the zigzag conductors are shaped so that there are effective loops also at both ends. When keeping the two halves of the loops as separate pieces it makes possible to shift the coil halves relatively to each other, as well as to put the coil halves into some angle relatively to each other, if needed. The double zigzag coils of the invention can be on one side of the strip, on both sides of the strip or advantageously so that the strip goes between the sides.

The double zigzag coils of the invention were tested using strip samples of copper or copper alloys as C510, C7026 and OF—Cu (oxygen-free copper) under the power source of 10 kW with 30 kHz. As results from the tests it could be said that the inductor heated effectively, in one trial the offset was removed and both sides were directly on top of each other. In this case there was no heating, confirming the fact that the loops were essential, the temperature profile appeared quite even, the temperature profile appeared insensitive to exact position or width of the strip, even if the coil was essentially wider than the strip, the heating was still good and even. No overheating the edges were observed, no buckling tendency was observed, heating pattern could be influenced by keeping a piece of flux concentrator close to the coil.

Based on the results a strip annealing line was equipped with induction coils as described. All the observations in the preliminary test were confirmed and as an additional benefit the speed of the annealing line were doubled.

The invention is described in more details referring to the appended drawings, wherein.

Figure 1:
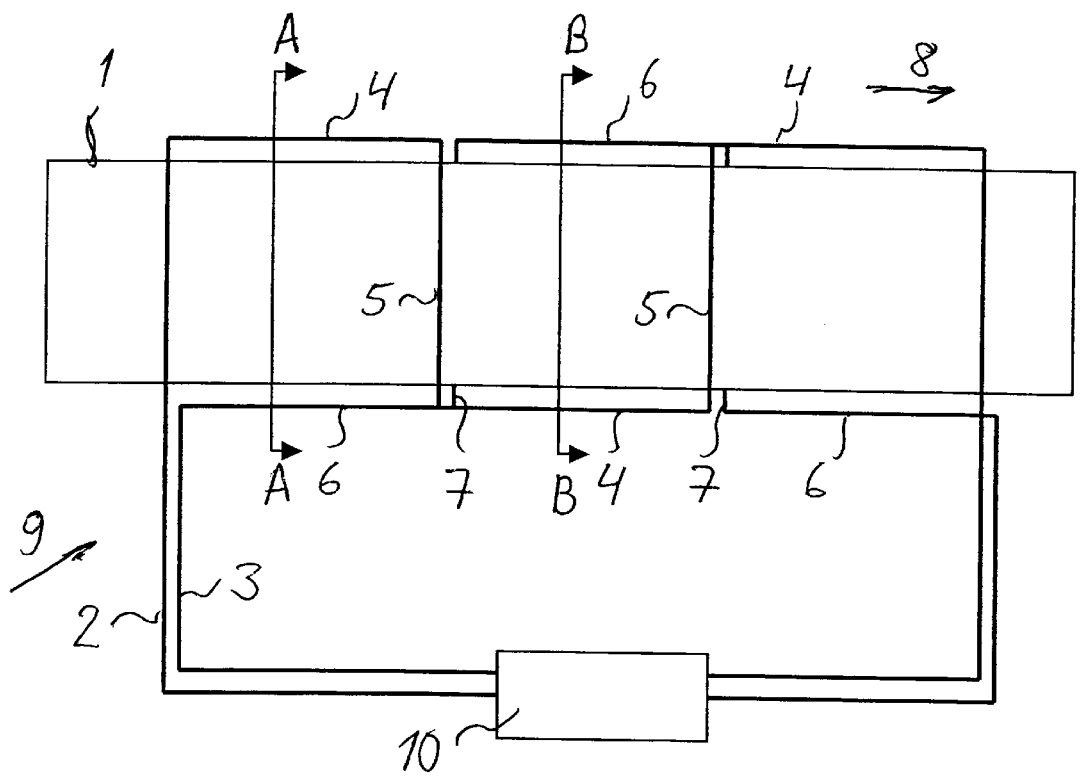
FIG. 1 shows one preferred embodiment of the invention as a schematic top-view.
Figure 2:
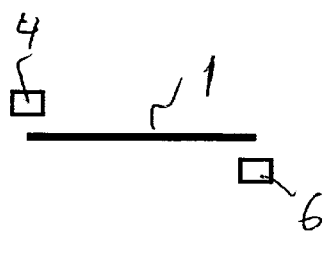
FIG. 2 shows the embodiment of FIG. 1 seen from the direction A—A.
Figure 3:
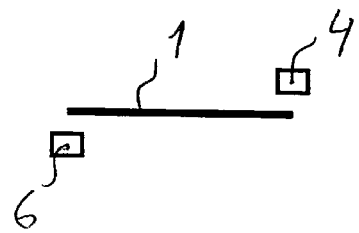
FIG. 3 shows the embodiment of FIG. 1 seen from the direction B—B.

In FIGS. 1 to 3 a transverse induction flux heater 9 is positioned so that a strip 1 to be heated moves between the two separate identical loops 2 and 3 of the heater 9. The loops 2 and 3 are connected with the power source 10 so that the induced current path coming to the heater 9 is divided equally for both loops 2 and 3. The loops 2 and 3 are shaped so that the parts 4 and 5 of the loop 2, and respectively 6 and 7 of the loop 3, are parallel (parts 4 and 6) to the moving direction (shown as an arrow 8) of the strip 1 or perpendicular (parts 5 and 7) to the moving direction 8 of the strip 1. The loops 2 and 3 of the heater are overlapped so that the parts 5 and 7 are positioned in the essentially same point with respect to the strip 1. Thus the parts 5 and 7 create an essentially full heating effect for the strip 1. On the contrary, the parts 4 and 6, which are close to the edges of the strip 1, create only a quarter heating effect for the edges of the strip 1. Therefore, essentially even temperature distribution is created for the strip 1.

Figure 4:
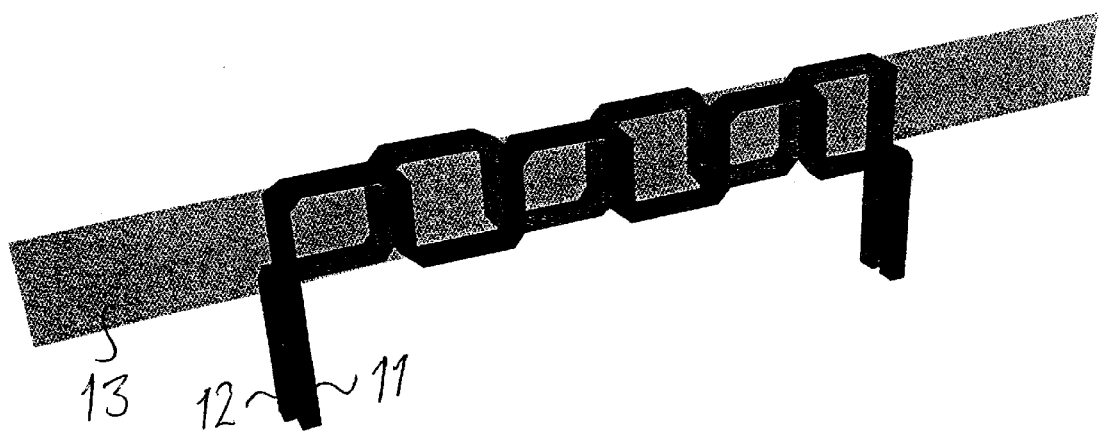
FIG. 4 shows another preferred embodiment of the invention as a schematic side-view.

The embodiment illustrated in FIG. 4 is similar to the embodiment illustrated in FIGS. 1 to 3, but differs from that embodiment in such that the loops 11 and 12 of the heater are positioned in the same side of the strip 13 to be heated.

Figure 5:
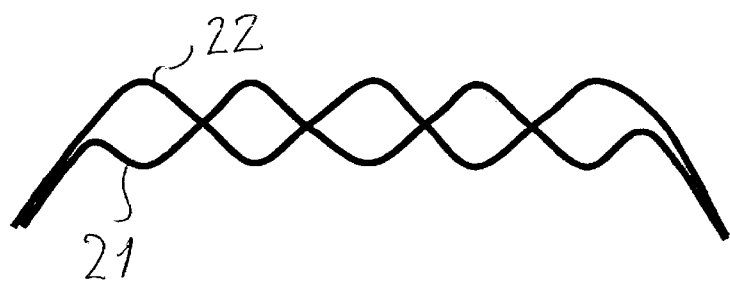
FIG. 5 shows still another preferred embodiment of the loops of the invention as a schematic side-view.

In FIG. 5 the loops 21 and 22 contain two sinusoidal conductors, which are in an overlapped position to each other. Based on the sinusoidal conductors the loops 21 and 22 are superimposed with a phase shift of 90 degrees.

What is claimed is:

1. An induction heating coil for transverse flux induction heating of an object in the form of an elongate metal workpiece, the workpiece having a longitudinal axis, the coil comprising:

at least two separate shaped conductors, first and second conductors each having segments substantially perpendicular to and segments substantially parallel to the longitudinal axis of the workpiece, the perpendicular and parallel segments of each conductor forming U-shaped segments along the longitudinal axis of the workpiece, respective perpendicular segments of the first and second conductors substantially overlapping one another, each U-shaped segment having an open end, the at least two separate conductors being capable of heating the workpiece when respective U-shaped segments from the at least two separate conductors are arranged to form a substantially closed loop, any one conductor being incapable of independently heating the workpiece.

2. Coil according to claim 1, wherein the at least two conductors are positioned on the same side of the workpiece.

3. Coil according to claim 2, wherein respective perpendicular segments of the at least two conductors overlap and are zigzag conductors superimposed to form a multi-loop inductor.

4. Coil according to claim 2, wherein the at least two conductors consist of parts positioned parallel to the moving direction of the workpiece.

5. Coil according to claim 2, wherein the at least two conductors consist of parts positioned perpendicular to the moving direction of the workpiece.

6. Coil according to claim 1, wherein the at least two conductors are positioned on both sides of the workpiece.

7. Coil according to claim 6, wherein respective perpendicular segments of the at least two conductors overlap and are zigzag conductors superimposed to form a multi-loop inductor.

8. Coil according to claim 6, wherein the at least two conductors consist of parts positioned parallel to the moving direction of the workpiece.

9. Coil according to claim 6, wherein the at least two conductors consist of parts positioned perpendicular to the moving direction of the workpiece.

10. Coil according to claim 1, wherein respective perpendicular segments of the at least two separate conductors overlap, and the conductors are zigzag conductors superimposed to form a multi-loop inductor.

11. Coil according to claim 10, wherein the at least two conductors consist of parts positioned parallel to the moving direction of the workpiece.

12. Coil according to claim 10, wherein the at least two conductors consist of parts positioned perpendicular to the moving direction of the workpiece.

13. Coil according to claim 1, wherein the at least two conductors consist of parts positioned parallel to the moving direction of the workpiece.

14. Coil according to claim 13, wherein the at least two conductors consist of parts positioned perpendicular to the moving direction of the workpiece.

15. Coil according to claim 1, wherein the at least two conductors consist of parts positioned perpendicular to the moving direction of the workpiece.

16. Coil according to claim 1, wherein the at least two conductors are identically shaped.

17. Coil according to claim 16, wherein the at least two conductors are sinusoidally shaped.

18. Coil according to claim 1, wherein the first and second conductors each carry substantially one half of a predetermined electrical current, resulting in an overall heating effect substantially equal to one half of the heating effect of a unitary induction heating coil supplied with said predetermined current if said unitary induction heating coil has the same length as the first and second conductors.

* * * * *